W. H. R. MILDEBRATH.
COURSE INDICATOR.
APPLICATION FILED JAN. 29, 1917.

1,260,236.

Patented Mar. 19, 1918.
3 SHEETS—SHEET 1.

WITNESSES
W. C. Fielding
Wm Zeaman

INVENTOR
Willy H. R. Mildebrath
BY Richard Owen.
ATTORNEY

W. H. R. MILDEBRATH.
COURSE INDICATOR.
APPLICATION FILED JAN. 29, 1917.
1,260,236.
Patented Mar. 19, 1918.
3 SHEETS—SHEET 2.
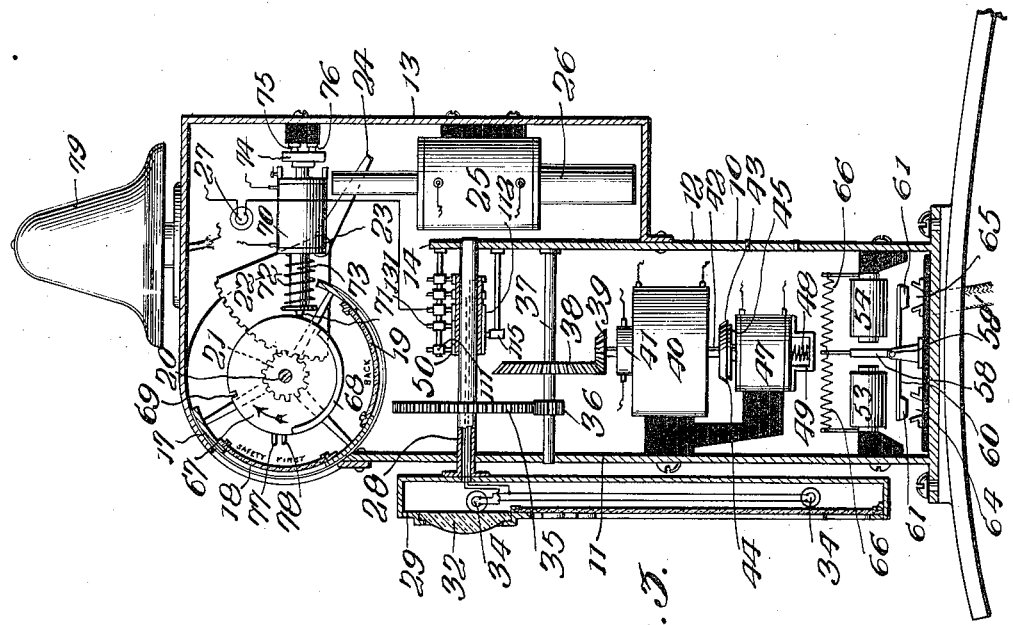
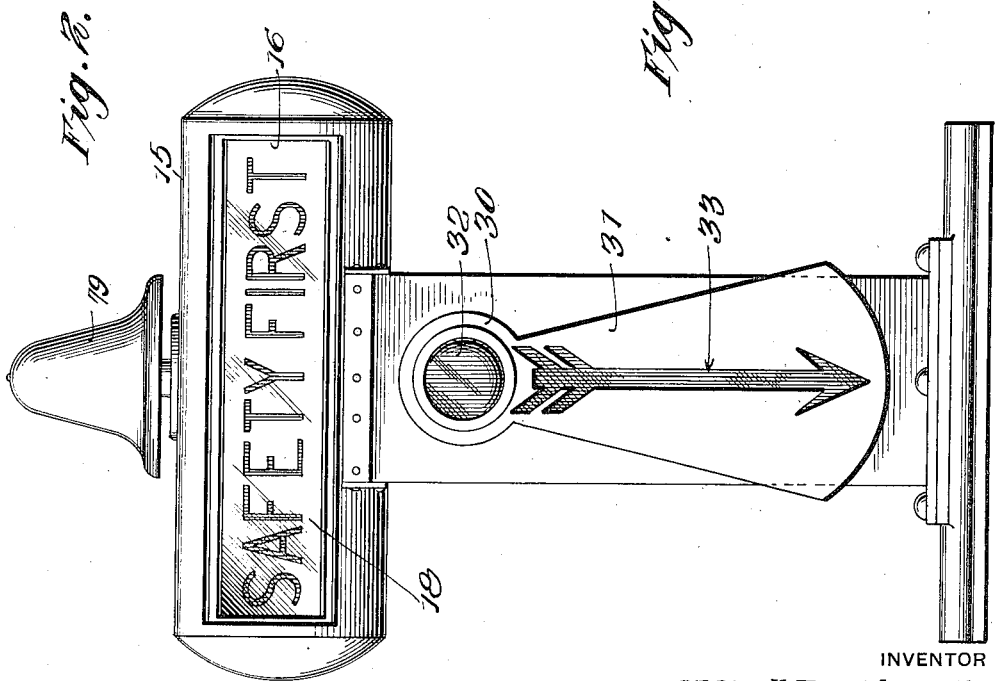
WITNESSES
INVENTOR
Willy H. R. Mildebrath
BY
ATTORNEY W. H. R. MILDEBRATH.
COURSE INDICATOR.
APPLICATION FILED JAN. 29, 1917.
1,260,236.
Patented Mar. 19, 1918.
3 SHEETS—SHEET 3.
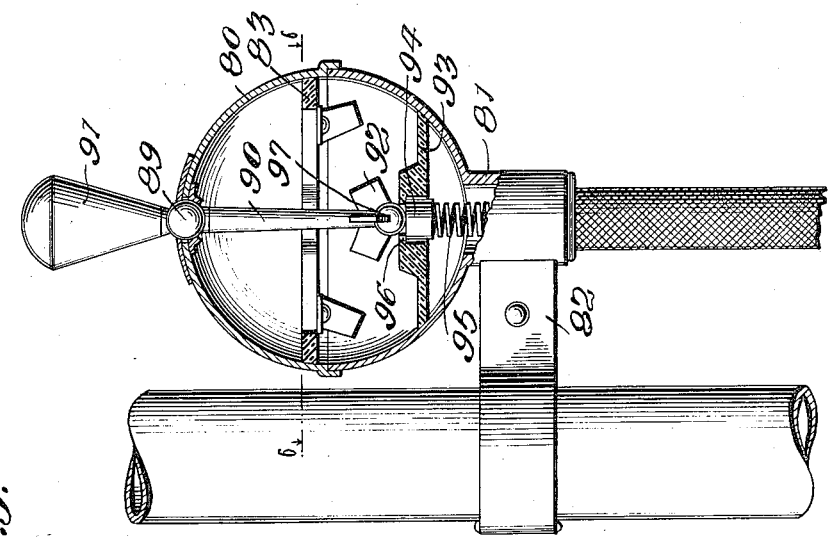
Fig. 5.
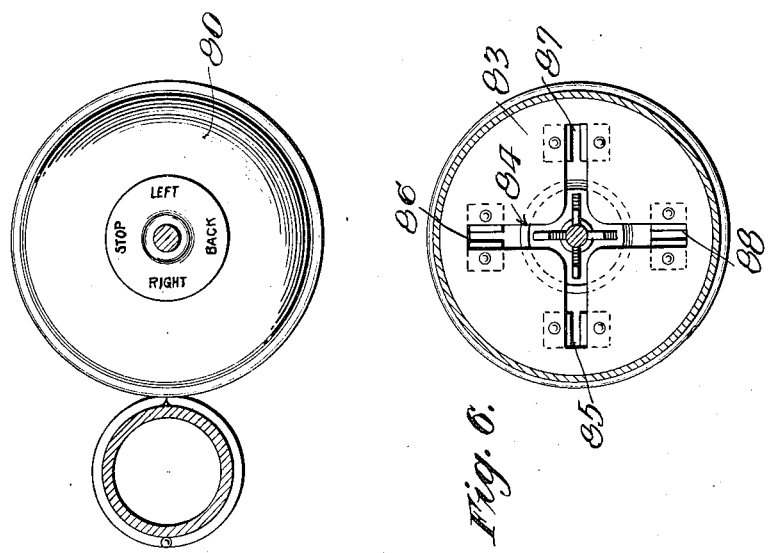
Fig. 4.
Fig. 6.
INVENTOR
Willy H. R. Mildebrath
WITNESSES

UNITED STATES PATENT OFFICE.

WILLY H. R. MILDEBRATH, OF JACKSONVILLE, FLORIDA.

COURSE-INDICATOR.

1,260,236.   Specification of Letters Patent.   Patented Mar. 19, 1918.

Application filed January 29, 1917. Serial No. 145,241.

*To all whom it may concern:*

Be it known that I, WILLY H. R. MILDEBRATH, a citizen of the United States, residing at Jacksonville, in the county of Duval and State of Florida, have invented certain new and useful Improvements in Course-Indicators, of which the following is a specification.

This invention has relation to traffic signals for motor vehicles or the like, and has for an object to provide signaling devices at the forward and rear ends of the vehicle of the type having a semaphore arm, with electrically operable means controllable by the driver for causing the arms to move to the right or left whereby to warn the occupants of approaching or following vehicles of the fact that the vehicle bearing the signal is about to turn to the right or left as the case may be.

Another object of the invention is to provide signaling devices for motor vehicles having the above named characteristics with means whereby the semaphore arms may be moved to the right or left for the purpose set forth, and also moved to a vertical position pointing in an upward direction whereby to indicate the fact that the vehicle bearing the signals is about to make a stop, the devices also embodying means for returning the semaphore arms in a positive manner to normal depending positions from any of its signaling positions.

Another object of the invention is to provide signaling devices adapted to be placed at the front and rear ends of a motor vehicle, with means on the rear signaling device for constantly displaying a symbol of warning adapted to be illuminated whereby it may be visible at night, with means for illuminating the semaphore arm, and means for extinguishing the luminant of the constantly displayed signal at such times as the semaphore arm is to be moved, whereby to render the appearance of the semaphore arm more distinct, the luminant of the constantly displayed signal being automatically illuminated when the semaphore arm has returned to normal position.

A still further object of the invention is to provide a signaling device adapted to be located upon the rear end of a motor vehicle embodying means for constantly displaying a symbol of warning, when the vehicle is traveling in a forward direction, and means controllable by the driver for displacing said constantly displayed symbol with a sign bearing the word "Back" thereby indicating to the occupants of approaching vehicles that the vehicle bearing the signal is about to proceed in a rearward direction.

A still further object of the invention is to provide signaling devices having the characteristics above mentioned, and adapted to be placed at the forward and rear ends of a motor vehicle, and including means for sounding an audible signal when the semaphore arms are moved to signaling position, the signal ceasing to sound when the semaphore arms have reached the limit of desired movement, said signals also sounding when the semaphore arms are returned from their signaling position to normal position.

A still further object of the invention is to provide a novel electric switch adapted to be located upon the steering column whereby the several movements of the semaphore arm and signaling apparatus mentioned above may take place without effort on the part of the driver.

A still further object of the invention is to provide a novel arrangement of electrical apparatus for actuating the semaphore arms of the signals mentioned above.

In addition to the foregoing my invention comprehends improvements in the details of construction and arrangement of parts to be hereinafter more fully described and particularly set forth in the appended claims.

In the accompanying drawings in which similar and corresponding parts are designated by the same characters of reference throughout the several views in which they appear:

Fig. 2, is a view in front elevation of the rear signaling device.

Fig. 3, is a view in vertical section of the signaling device shown in the preceding figure.

Fig. 4, is a view in plan, partly in section of the manually operable controlling switch secured to the steering column.

Fig. 5, is a view of the controlling switch in vertical section, and

Fig. 6, is a horizontal section taken on the line 6—6 of Fig. 5.

Figure 1:
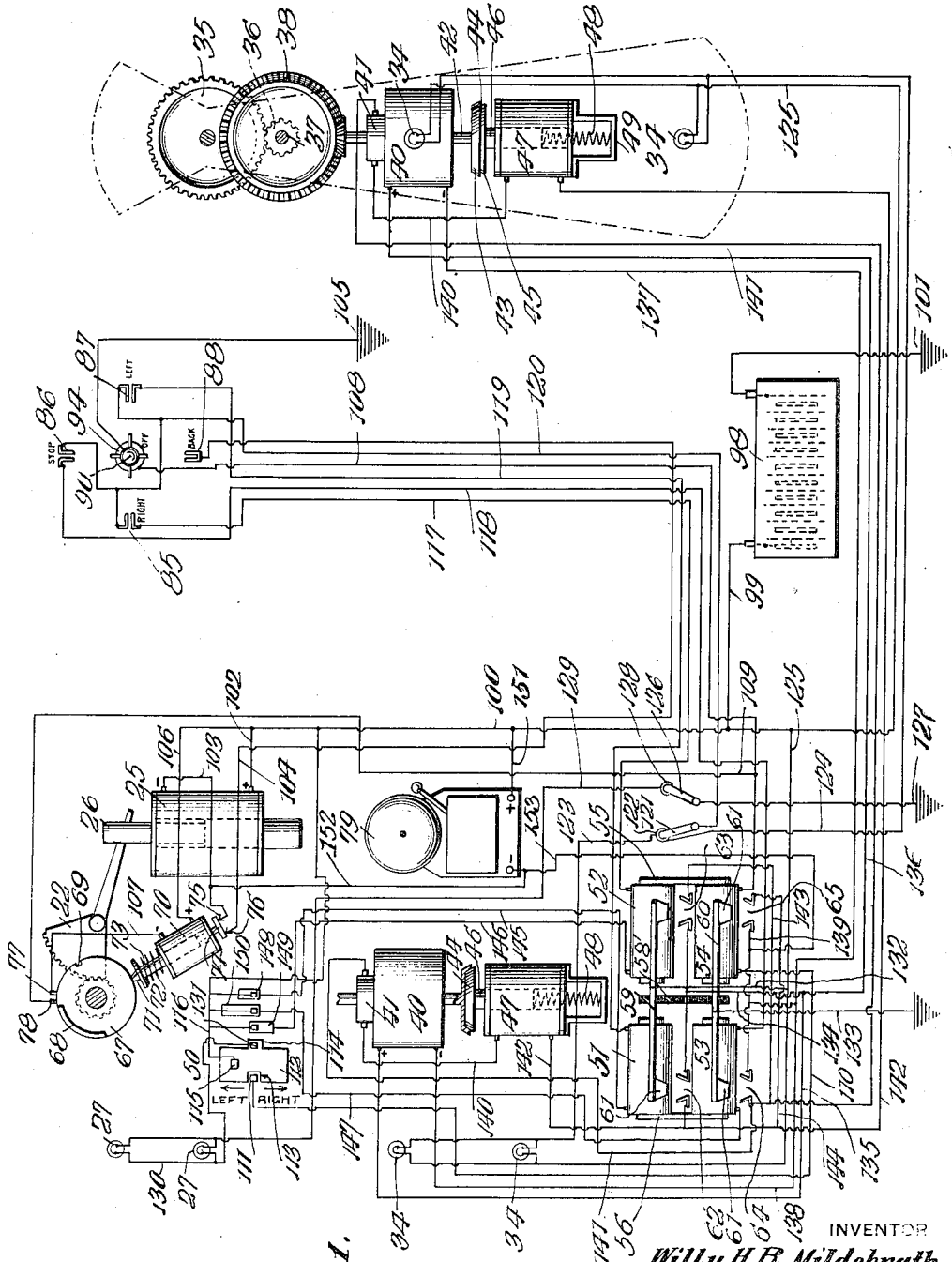
Figure 1, is a diagrammatic view of the elements of a forward and rear signaling device constructed after the manner of my invention, and illustrating the preferred form of wiring and electrical connections therebetween and for controlling and producing operation of the same.

With reference to Figs. 2 and 3 of the drawings which illustrate respectively views in elevation and section of the signaling device adapted to be placed upon the rear of the vehicle, 10 indicates a vertically extending rectangular casing including a front wall 11 and a rear wall 12. An extension 13 is built upon the rear of the casing and the rear wall 12 extends upwardly thereinto to form a partition 14 for a purpose which will be presently noted. Mounted upon the upper end of the casing 10 is a transversely extending horizontal cylindrical casing 15 having elongated opening 16 in its front side wall whereby to display a signal. Mounted for rotation concentrically within the casing 15 is a drum member 17 cut away to receive a curved pane of transparent material 18, the drum being similarly cut away at a point at substantially right angles to said pane 18 to receive a second pane 19. The pane 18 has painted, or otherwise inscribed thereupon the words "Safety first," while the pane 19 is provided with the word "Back." The pane 18 is designed to be displayed normally through the opening 16 of the cylindrical casing, while the pane 19 is normally disposed within the casing 10 and is only displayed at such times as the drum is rotated to bring the pane behind the opening in the cylindrical casing. The drum 17 is mounted upon a horizontal shaft 20, which has fixedly secured thereto a spur gear 21 for meshing engagement with a segmental gear 22 mounted for rotation upon a stub shaft 23 journaled in one side wall of the casing 10, said segment having an arm 24 extending in a direction opposite the segmental gear. A solenoid 25 is mounted upon the wall of the extension 13 of the casing 10 with a vertically movable core 26 disposed in said solenoid, the upper end of the core having an elongated opening or recess in which to receive the arm 24 of the segmental gear. It will be obvious that if the solenoid is energized, the core therein will be moved in an upward direction thereby partially rotating the segmental gear 22 whereby the drum 17 will be rotated to display the word "Back" behind the opening in the cylindrical casing 15. An incandescent globe 27 is disposed within the casing 10 at the upper portion thereof whereby to illuminate the letters upon the panes 18 or 19.

A longitudinally extending horizontally disposed tubular shaft 28 is located within the casing 10 with one end journaled for rotation in the front wall 11 of the casing, and the opposite end journaled in the partition 14 formed by the vertical extension of the rear wall of the casing. The forward end of the tubular shaft is designed to project beyond the front wall of the casing to support a semaphore arm 29 in the form of a casing, the hub portion 30 of which is circular and concentric with the shaft 28, the semaphore arm including a vane 31 which normally depends in a vertical position. The hub portion 30 of the semaphore arm is provided with an opening normally covered by a colored glass 32, while the vane 31 is provided with an opening 33 in the shape of an arrow, also covered with a pane of colored glass. Incandescent globes 34 are mounted within the hub portion and vane of the semaphore, whereby to illuminate the colored panes at night.

The tubular shaft 28 is provided within the casing with a relatively large spur gear 35 adapted for meshing engagement with a pinion 36 mounted upon a shaft 37 disposed parallel to the shaft 28, beneath the same and similarly mounted, said shaft 37 also carrying a relatively large bevel gear 38 for meshing engagement with a smaller bevel gear 39 mounted upon the vertically extending shaft of an electric motor 40 located within the casing 10. The motor is provided with the usual commutator 41 which is electrically connected to the controlling mechanism of the signaling device in a manner to be presently noted. The lower end of the shaft 42 of the motor 40 is provided with the receptive member 43 of a cone-clutch indicated generally at 44, the core member 45 of said clutch being mounted upon a vertically movable core bar 46 inclosed within a solenoid 47 suitably supported within the casing 10. The core 46 is rectangular in cross section, and is designed to reciprocate in a correspondingly shaped opening in the solenoid whereby rotation of the core is prevented. A coil spring 48 located partly within the opening in the solenoid is supported at its lower end in a suitable frame work 49 depending from the solenoid, while the opposite end of the spring is designed to bear against the lower end of the core 46 to urge the same upward and thereby retain the members 45 and 43 of the cone clutch in constant engagement, said clutch member to be disengaged only at such times as the solenoid 47 is energized. It will be obvious that owing to this arrangement if the motor 40 is energized to rotate the semaphore arm, and the members of the cone-clutch subsequently permitted to mutually engage, further rotation of the motor will be prevented and the semaphore arm will be retained in the position to which it has been moved.

Before proceeding with a description of the remaining elements of the apparatus, attention is called to the fact that the tubular shaft 28 mentioned above has secured thereon for rotation simultaneously with the shaft, a commutator 50. This commutator is for the purpose of controlling or automatically limiting movement of the semaphore arm when the same is moved to any signaling position in a manner which will be presently noted, and the commutator is provided with a number of segmental sections which are shown developed in Fig. 1 of the drawings. The sections will be more specifically described later.

While the foregoing description has been that of the signaling device adapted to be located at the rear end of the vehicle, the forward device is a duplicate in construction thereof with the exception that the cylindrical casing 15 for displaying the signals "Safety first" and "Back" has been omitted. Owing to this fact no separate views of the forward signaling device have been given, but its elements have been shown diagrammatically in Fig. 1 of the drawings, and the elements of said device corresponding to those in the rear device are correspondingly numbered.

The motors 40 in the front and rear signaling devices are supplied with current through the medium of a number of relays, all of which are inclosed within the casing 10 of the rear signaling device, and are illustrated diagrammatically in Fig. 1, and more in detail in Fig. 3. In the diagrammatic view the electro-magnets 51, 52, 53 and 54 are designed respectively to actuate the relay mechanism for causing respectively movements of the semaphore to indicate "left," "right," "stop" and "off." The magnets 51 and 52, 53 and 54, are operable in pairs with their poles in opposed relation, the remote poles of the magnets 53 and 54 being connected together through the medium of a bar 55, the magnets 51 and 53 being similarly connected through the medium of a soft iron bar 56. Thus, if either magnet 52 or 54 is energized, the magnet not so energized will nevertheless transmit lines of force through its core whereby the cores of the two magnets form in effect a double pole magnet. The same is true of the magnets 51 and 53. Mounted for oscillation between the opposed poles of the magnets 51 and 52 and magnets 53 and 54 are armatures 57 and 58 respectively, said armatures being mounted upon a common shaft 58' of insulating material whereby a movement of one armature will be transmitted through the shaft to the other to produce a similar and corresponding movement thereof. It will be obvious that if either magnet 52 or 54 is energized, both armatures 57 and 58 will be attracted thereto, said armatures being attracted in an opposite direction when either of the magnets 51 or 53 are energized. Mounted upon the shaft 58' are a pair of relay switch arms 59 and 60 the opposite terminals of which are provided with wedge shaped switch blades 61. Beneath each switch blade 61 is a pair of spaced contacts adapted to be bridged when the blades are engaged therebetween, said contacts being indicated at 62, 63, 64 and 65, of Fig. 1. Coiled springs 66 connected to the armatures and to stationary points of the signaling device, act to normally retain the armatures mid-way between the poles between which they are placed thereby normally retaining the switch blades 61 out of contact with their respective contacts disposed therebeneath.

To return to the casing 15 at the upper end of the signaling device, mounted upon the drum shaft 20 journaled therein is a disk 67 of insulating material having a portion of its periphery cut away to receive an arcuate metallic segment 68, the periphery of the disk being also provided with a notch 69. Mounted in the plane of the disk is a solenoid 70 having a movable core therein provided at one end with a reduced portion 71, which at times is adapted to be engaged in the notch 69 of the disk, movement of the core to that end being insured through the medium of a spring 72 which encircles the core. The core, which is indicated at 73 extends beyond the opposite end of the solenoid and is provided with a metallic bar 74 adapted to normally connect a pair of contacts 75 and 76 insulated from each other and stationarily mounted upon the wall of the rear extension 13 of the casing. With the drum and disk disposed in the position shown in Fig. 3 of the drawings, that is with the end of the core 73 resting against the periphery of the disk, the bar 74 will engage the contact 75 and 76 to connect the same. However, when the drum is rotated to permit the end of the core to enter the notch 69, the bar 74 is withdrawn from engagement with the contacts 75 and 76 to disconnect the same. Adjacent the periphery of the disk 69 there is also mounted a pair of contacts 77 and 78 which normally rest against the insulated edge of the disk, but are adapted to be connected at times by the engagement therewith of the metallic segment 68 of the disk when said disk is rotated.

In order that the occupants of approaching or following vehicles may be appraised of the fact that a signal is being displayed, I provide an audible signal in the way of a bell 79 mounted upon the upper end of the rear signal device casing with connections whereby the bell may be sounded automatically when the semaphore arm is moved to one of its signaling positions.

The operation will be clear as the electrical connections are better understood.

For controlling and initiating operation of the signaling devices described above, I provide a novel form of electric switch, set forth in detail in Figs. 4, 5 and 6, and diagrammatically in Fig. 1. The switch device is adapted to be secured upon the steering column of the vehicle, and includes a hollow spherical casing 80 formed in separable halves, the lower half being provided with a tubular extension 81 provided with a clamp 82 adapted to engage around the steering column. A horizontal partition 83 of insulating material is mounted within the casing and is preferably secured to the upper half thereof. This partition 83 is formed with a cruciform opening 84, and at the extremity of each arm of said opening there is provided a pair of spaced contacts which are indicated in the diagrammatic view at 85, 86, 87 and 88. A switch arm is depended from the zenith of the upper half of the casing and is adapted to extend through the partition 83 at the intersection of the arms of the cruciform opening 84. A universal joint 89 is provided at the upper end of the switch arm, which arm is indicated at 90, a knob 91 being connected to the universal joint and extended exteriorly of the casing in a vertical direction whereby upon grasping the knob the switch arm 90 may be moved along the arms of the cruciform opening in the partition 83 in either direction. The lower end of the switch arm 90 carries a plurality of knife blades 92 which are adapted to engage between their respective co-acting spaced contacts provided at the extremities of the arms of the cruciform opening when the switch arm is moved for this purpose. A partition 93 is provided in the lower half of the casing 80 and is formed with a central opening in which a plug 94 is mounted for vertical movement, the plug being urged in an upward direction through the medium of a spring 95 which bears against the under side of the plug, the movement of the plug being limited through the provision of shoulders 96 formed around the opening in the partition 93. Upon reference to Fig. 5 it will be noted that when the switch arm 90 is in a midway vertical position a spherical enlargement 97 on the lower end of said switch arm is adapted to engage within the opening in the partition 93 and against the plug 94 to form an electrical contact therewith.

The electric current for actuating the various electrically operable devices included in the signaling devices, may be supplied from the storage battery of the motor vehicle, said battery being indicated at 98 in the diagrammatic view, a lead 99 being taken from one pole of the battery and connected to a main current supply lead 100, the opposite pole of the battery being grounded as indicated at 101.

A conductor 102 supplies current from the main lead 100 to the solenoid 25 for rotating the constantly displayed signal drum, the current entering one terminal thereof, the other terminal of the solenoid being connected through the medium of a conductor 103 to the contacts 75 adjacent the solenoid 70. The other contact 76 associated therewith and adapted to be connected to the first mentioned contact through the medium of the bar 71, is connected through the medium of a conductor 104 to the spaced contact 88 in the manually controlled switch which is mounted on the steering column. It might be mentioned in this connection that the switch arm 90 of said switch may be grounded as indicated at 105. One terminal of the above mentioned solenoid 70 is connected by a wire 106 to the main current supply lead 100, the other terminal of the solenoid being connected through the medium of a wire 107 to the brush 77 which engages the periphery of the disk 67.

The movable plug 94 is connected by a wire 108 to one terminal of the electro-magnet 54 of the set of relays located in the casing of the rear signal device, a lead 109 being taken from said wire 108 and led to the other brush 78 which bears against the disk 67 mentioned above. The other terminal of the said electro-magnet 54 is connected through the medium of a wire 110 to a brush 111 which is adapted to bear against the surface of the commutator 50 mentioned above. The section 112 of the commutator is a continuous band of metal having a notch 113 cut away in one margin, the opposite margin being provided with an extension 114 in longitudinal alinement with the notch 113. The brush 111 is normally adapted to rest against the commutator in the notch 111 whereby to be normally disposed out of contact with the section 112 but to engage said section when the commutator is moved in either direction. A brush 115 bears against the continuous portion of the section 112 of the commutator, and is connected through the medium of a wire 116 to the main current supply lead 100.

The spaced contacts 85, 86 and 87 of the manually operable switch are connected through the medium of conductors 117, 118 and 119 respectively with one of the terminals of the magnets 52, 53 and 51, said contacts also being connected to a conductor 120 which is connected at its opposite end to the arm 121 of a single pole switch which is adapted to engage a contact 122. A wire 123 is run from the contact 122 to the lamp 34 of the rear signaling device, a lead 124 being similarly taken from the contact 122 of the switch and led forward to the corresponding lamp 34 of the forward signaling device. The return leads 125 from said lamps are then connected to the main current supply 100. A second single pole switch is provided including an arm 126 connected to the ground 127, and including a contact 128 which is connected through the medium of a lead 129 to the lamps 27 located in the upper portion of the rear signaling device for illuminating the constantly displayed warning, the return lead 130 from said lamps being connected to a brush 131 which is adapted to normally bear against the above mentioned extension 114 of the section 112 of the commutator 50.

To proceed with a description of the connections between the relays and the motors, the bar 59 of the relays, is connected through the medium of a wire 132 to the conductor 125 which as mentioned above, is in turn connected to the main current supply lead 100. The other arm 60 of the relays is grounded through the medium of a conductor 133. Adjacent contacts of the pairs of contacts 62 and 63 are connected together for electrical communication, and in turn connected through the medium of a lead 134 to a conductor 135 which extends to the positive terminal of the field magnet of the motor 40 in the rear signal device. A lead 136 is also taken from the conductor 134 at the point of connection thereof 135, and led forward through the positive terminal of the field magnet of the motor 40, located in the forward signaling device. The negative terminals of the field magnet of the forward and rear motors are connected through the medium of conductors 137 and 138 to a conductor 139 which connects adjacent contacts of the pairs of contacts 64 and 65.

Before proceeding further it is to be noted that one terminal of each solenoid 47 is connected to one of the brushes of the motor disposed immediately thereabove through the medium of conductors 140. The other brush of each motor is connected through the medium of a conductor 141 with one of the contacts of the spaced contacts 64 as indicated in Fig. 1 of the drawings and the heretofore unmentioned terminals of the solenoids 47 are connected through the medium of conductors 142 to one of the spaced contacts 62. A lead is taken from one of the above mentioned conductors 141 and connected to one of the contacts of the spaced contacts 63 by means of a wire 143, a similar connection being made through the medium of a wire 144 between one of the conductors 142 and the spaced contacts 65. The heretofore unmentioned terminals of the electro-magnets 51, 52 and 53, of the relays are connected through the medium of conductors 145, 146 and 147 to sections 148, 149 and 150 of the commutator 50, each of said sections being adapted to contact with brushes stationarily mounted, and connected to the conductor 116 which leads to the main current supply lead 100. Sections 148 and 149, are extended around the commutator in opposite directions for approximately one quarter its circumference, while the section 150 is extended around the commutator for one-half its circumference in the direction of the section 148.

Referring to the audible signal 79, one terminal thereof is connected to the main current supply lead 100 through the medium of a conductor 151, the other binding post of the bell being connected through the medium of a conductor 152 with the conductor 103 which connects one terminal of the solenoid 25 with the contact 75, said binding post of the bell being also connected through the medium of a conductor 153 with the connection 139 between the spaced contacts 64 and 65.

It will be apparent that if the arm 121 of the single pole switch is moved to closed position, current from the source 98 may traverse the conductor 99 to the main supply lead 100 from which its enters both conductors 125 leading to the front and rear signaling devices, and after passing through the lamps 34 effects a return by means of the conductors 123 and 124, and conductor 120 which is common to the spaced contacts 85, 86 and 87, of the manually operable switch. Thus, it will be obvious, that if the switch arm 90 is moved to engage either of these mentioned contacts the circuit will be completed through the ground 105 and ground 101 of the source of current thereby illuminating the lamps 34, in the semaphore arm.

To cause the semaphore arms to swing to the right, the manually operable switch is manipulated to move the switch arm 90 into engagement with the spaced contacts 85, whereupon a circuit may be traced starting from said contacts 85 as follows: Along the conductor 117 to the electro-magnet 52 of the relay, leaving said electro-magnet by means of the conductor 146 which enters the section 149 of the controlling commutator 50. In the normal position of the commutator corresponding to the depending position of the semaphore arm, a brush is in contact with the section 149 mentioned above, which brush is connected to the conductor 116. Therefore the circuit is completed through said brush the conductor 116 returning through the main current supply lead 100 which is in communication with the source of current 98 through the medium of the conductor 99. The circuit is then completed through the ground 101 of the source of current and the ground 105 of the switch arm 90. The circuit having been established through the electro-magnet 52 of the relay, said electromagnet is energized whereby its armature is attracted to dispose the right-hand terminal of the relay arm 59 in engagement with the spaced contact 63. Owing to this movement the right-hand terminal of the adjacent relay arm 60 is likewise brought into engagement with the spaced contact 65, and a circuit starting from the source of current 98 may be traced as follows: Through the conductor 99 leading from said source of current, to the main current supply lead 100, from thence, through the conductor 125 to the conductor 132 joined thereto, and which conductor 132, extends to the relay arm 59. From the right hand terminal of the arm 59 the current branches into either of the spaced contacts, and for the purpose of convenience, we will follow the current from the right hand member of said contact. Starting from said right-hand member of the contact 63 the current traverses the conductor 143 entering the conductor 141 which is in communication with one of the brushes of the motor 40 on the rear signaling device. It is also to be noted that at the point of connection of the conductor 143 with the conductor 141, a branch is taken and numbered 141 also to one brush of the front motor 40. The current after passing through the armatures of both motors enters the solenoids 47 disposed therebeneath, the current after leaving said solenoid traversing the conductors 142 and leaving by means of the conductor 144 connected thereto. The current after having traversed conductor 144 enters the right-hand member of the spaced contact 65 from which it enters the relay arm 60 effecting an exit through the conductor 133 connected thereto, to the ground, and in this manner returning to the source of current 98. Thus it will be seen that the armatures of both motors are energized to swing the semaphore arm to the right. However, the fields of both motors are separately energized, and to return to the right hand terminal of the relay arm 59 from which the current bends at the contact 63, the course of the current will be followed from the left-hand member of the contact 63 as follows: Along the conductor connecting the inner members of the spaced contacts 62 and 63 to the conductor 134 connected thereto to the branched conductors 135 and 136, the conductor 135 leading to the field of the rear motor 40 returning through the conductor 138 to the conductor 139 which connects the inner members of the spaced contacts 64 and 65, from which connecting member the current leaves the inner member of the spaced contact 65 through the relay arm 60 effecting an exit through the conductor 133 to the ground. From the point of connection of the conductor 134 with the conductor 135, the current also traverses the conductor 136 to the field magnet of the forward motor returning by means of the conductor 137 to the inner member of the spaced contacts 65 and completing its circuit as before. In this manner, the field magnets of both motors are energized.

Both motors having thus been set in motion, the semaphore arm is swung to the right and owing to such movement the commutator 50 is likewise rotated until the section 149 thereon is moved out of engagement with the brush contacting therewith thereby breaking the circuits which lead through the relay magnet 52. As a result the arms 59 and 60 of the relay are returned to their normal position breaking their contacts previously established whereby further supply of energy to the motors is cut off. Attention is called to the fact that when the armatures of the motors were originally energized the current also traversed the solenoids 47 disposed therebeneath whereby the cores 47 disposed therewithin were moved downward to disengage the members of the clutch 44. As a result rotation of the motors was permitted. However, when the circuit through the motors was disestablished owing to the return of the arms 59 and 60 to their normal position, the members of the clutches 44 were reëngaged owing to the tension of the springs 48 whereby the motors are suddenly stopped and the semaphore arms retained in a signaling or horizontal position pointing toward the right.

To return the semaphore arms to normal depending position after the signaling devices have served their purpose, the manually operable switch is manipulated to bring the switch arm 90 back to normal depending position in engagement with the plug 94. A circuit may be traced leading from said plug as follows: Along the conductor 108 to the electro-magnet 54 of the relays, leaving said electro-magnet through the conductor 110 which is connected to the brush 111 in contact with the commutator 50. It will be remembered that the commutator 50 had been rotated when the semaphore arms were moved to signaling position, thereby disposing the brush 111 in contact with the section 112 of said commutator, as a result the circuit is traced from said section through the brush 115 normally bearing thereagainst, through the conductor 116 connected thereto to the main current supply lead 100, thence back to the battery 98 completing the circuit through the ground to the plug 94. Owing to the electro-magnet 54 of the relays having been energized, the right-hand terminals of the relay arms 59 and 60 are moved downward into engagement with their corresponding spaced contacts whereby current from the battery 98 may be traced through a circuit as follows:—along the conductor 99 to the main current supply lead 100, from thence along the conductor 105 to the conductor 132 which is connected to the relay arm 59; from the right-hand terminal of said arm 59 to the spaced contacts 63, branching at said contacts and leading to the armatures of the motors and field magnets thereof in a manner identical with that set forth in the circuit traced above whereby the solenoids 27 are energized to disengage the clutch members to permit rotation of the motors. The semaphore arms are then rotated, producing corresponding rotation of the commutator 50 until the notch 113 of the section 112 of the commutator is brought beneath the brush 111 whereby the circuit through the electromagnet 54 of the relays is disestablished thereby cutting off further supply of current to the motors. The semaphore arms will thus be moved to and retained in normal depending position until the manually operable switch is further manipulated to produce other movements of the apparatus.

To cause the semaphore arms to move to the left, the manually operable switch is manipulated to move the switch arm 90 in contact with the spaced contacts 87 whereby a current may be traced from said arm through the said spaced contacts along the conductor 119 to the electro-magnet 51 of the relay, leaving said magnet and entering the conductor 145 which leads to the section 148 of the commutator 50. A brush in contact with said sections conducts the current to the conductor 116 which is in communication with the main current supply lead 100 in turn in communication with the battery through the medium of the conductor 99. The magnet 51 is thus energized to dispose the left hand terminals of the arms 59 and 60 in engagement with the spaced contacts 52 and 54 whereby the circuit through the armatures of the motor 40 may be traced as follows: through the conductor 99 to the main current supply lead 100, leaving the same through the conductor 125 and entering the conductor 132 which is connected to the arm 59. The current leaves the arm 59 through the switch blades 61, branching therefrom and entering on the one hand the conductor 142 entering the solenoid 47. The current also branches from the left hand member of the contact 62 entering the conductor 142 which leads to the solenoid 47 of the forward motor. The current after passing through the armatures of the motors leaves the same through the conductors 141 thereof entering the left-hand member of the spaced contact 64 in turn traversing the relay arms 60 and the conductor 132 connected thereto to the ground. It will be noted that the current enters the armatures of the motors in a direction the reverse from that in which the current entered when the arm 90 of the manually operable switch was in engagement with the contacts 85, thus rotation of the motors in a reverse direction is produced to move the semaphore arms to the left. With reference to the commutator 50 it will be noted that the section 148 is extended to the left around said commutator whereby when the semaphore arms are disposed in a horizontal position to the left the section 148 will be disposed out of engagement with its brush to disestablish electrical communication through the electro-magnet 51 whereby further supply of current to the motors is cut off and other mechanism actuated to retain the arms in signaling position. A return of the semaphore arms from such position can take place by moving the switch arm 90 to normal depending position in engagement with the plug 94 in exactly the manner recited above.

To operate the signaling devices to indicate that the vehicle bearing the same is about to make a full stop, the manually operable switch is manipulated to dispose the switch arm in engagement with the spaced contacts 86 whereby a circuit can be established through the electro-magnet 53 of the relays and the section 150 of the commutator 50. It will be noted that this section 150 is longer than either of the sections 148 or 149, and extends approximately one-half the circumference of the commutator. As a result when the motors are energized in an obvious manner, rotation of the semaphore arms is permitted until they have assumed a vertical position pointing upward before the commutator is rotated sufficiently to disengage the brush from said section 150. Thus, this position of the semaphore arms will indicate the fact that the driver of the vehicle under discussion is about to make a full stop. To return the arms from such position to their normal depending position, it is but necessary to return the arm 90 of the manually operable switch to normal depending position in engagement with the plug 94 whereby the apparatus is actuated as stated above.

It is to be noted that lamps 34 in the semaphore arms are illuminated by night, during such times only as the arms are moving to signaling positions, while the lamps 27 in the upper portion of the rear signaling device are normally illuminated at night, and are automatically extinguished while the arms are moving to signaling position and are held in such position. The extinguishment of the lamps 27 takes place as follows: Normally the lamps 27 are energized through a circuit established as follows: from the battery 98 through the conductor 99 to the main current supply leads 100, thence through the conductor 116 to the brush 115 which bears normally upon the section 112 of the commutator 50. When the semaphore arm of the rear signaling device is disposed in normal depending position, the brush 131 will be in engagement with the lateral projection 114 of the section 112 whereby the circuit is completed through the conductor 130, through the lamps 27 returning by means of the conductor 129 to the contact 128 and arm 126 of the single pole switch to the ground 127 returning to the battery 98. However, when the rear semaphore arm is moved either to the right or to the left, the lateral projection 114 of the section 112 of the commutator will obviously be disengaged from the brush 131 to disestablish the circuit through the lamps 27 whereby they are extinguished. However, when the semaphore arm is returned to normal depending position, the lamps will be automatically relighted.

When the driver of a vehicle bearing these signaling devices desires to notify the occupants of a following vehicle that the vehicle under discussion is about to proceed in a reverse direction, the manually operable switch is manipulated to move the arm 90 thereof in engagement with the spaced contacts 88 whereby a circuit from the arm 90 may be established as follows: along the conductor 104 to the contact 76, through the bar connecting the same to the contact 75, from said contacts 75 through the conductor 103 to the solenoid 25, leaving said solenoid through the medium of the conductor 102, which is connected to the main current supply lead 100 which is in turn in communication with the battery 98. The solenoid 25 is thus energized whereby the core 26 is pulled upward to oscillate the segment 22 and thereby rotate the drum 17 to dispose the pane 19 bearing the word "Back" behind the opening 16 of the cylindrical casing 15. During such rotation of the drum the disk 67 is carried therewith until the notch 69 in the periphery thereof is moved opposite the projection 71 of the core 73 of the solenoid 70 whereby said projection is urged into the notch to prevent return of the disk 67 and consequently the drum in signaling position. The disk 67 having thus been rotated, the metallic segment 68 thereof is bridged across the spaced contacts 77 and 78 whereby when the arm 90 of the manually operable switch is returned to normal depending position to move the drum to normal position and again display the words "Safety first," a circuit is established leading from the plug 94 through the conductor 108, through the conductor 109 connected thereto, to the contact 78, through the metallic segment 68 to the contact 77, through the solenoid 70, leaving the same through the conductor 106 and returning by means of the main current supply lead 100 to the battery 98. The solenoid 70 having thus been energized its core 73 is moved to withdraw its projection 71 from out of engagement with the notch 69 and the disk 67 whereby the weight of the core 26 or other parts may serve to return the drum 17 to normal position. It will be noted that when the core 73 was moved to enter the projection of the disk, the bar 74 was moved out of engagement with the spaced contacts 75 and 76 thereby disconnecting this circuit to prevent short circuiting or unintended actuation of the apparatus when the manually operable switch is further actuated.

It is to be noted that each time the semaphore arms are moved to signaling position the audible signal 79 is sounded during such movement of the semaphore arms, the actuating current for said signals being traced as follows: from the battery 98 through the conductor 99 to the main current supply lead 100, through the conductor 151 to the signal 79, from said signal through the conductor 153 to the conductor 139 which connects the inner members of the spaced contacts 64 and 65 whereby the current may enter the bar 60 from either of said set of spaced contacts depending upon in which direction the bar 60 has been oscillated through the conductor 133 to the ground. Thus, when either of the magnets of the relay is energized, a sounding of the signal 79 will take place. Moreover, when the signaling arms reach their full signaling positions, the sounding of the audible signal will obviously automatically cease. It will also be obvious, that owing to the connection 152 which extends between one binding post of the audible signal and the conductor 173 leading to the solenoid 25, when the switch arm 90 of the manually operable switch is moved into engagement with the contacts 88 to display the word "Back," a sounding of the signal will take place in the same manner as when the semaphore arms are moved.

Thus it will be seen, that I have provided a novel signaling device which is capable of indicating a great variety of signals with but slight manipulation of a switch mechanism readily within reach of the driver, the various movements of the signaling mechanisms taking place automatically.

While I have illustrated and described my invention with some degree of particularity, I realize that in practice various alterations thereover may be made, and I therefore reserve the right and privilege of changing the form of the details of construction, or otherwise altering the arrangement of the correlated parts without departing from the spirit of the invention or the scope of the appended claims.

Having thus described my invention what I claim as new and desire to secure by Letters Patent is:—

1. In an automobile signal, a movable semaphore arm, an electric motor for moving the same to a signaling position, an electrically operable clutch mechanism for normally retaining the motor against movement, a relay including a switch in communication with said motor, clutch mechanism and a source of current, a manually operable switch in communication with the source of current, the relay operating means, and a current controller movable in unison with the semaphore arm whereby when the manually operable switch is closed the relay may be energized to release the clutch mechanism and energize the motor, said controller being operable when the semaphore arm has reached signaling position to deënergize the relay actuating means to permit the clutch mechanism to be set whereby to retain the arm in signaling position.

2. In an automobile signal, a rotatably mounted semaphore arm, a motor for operating said arm, one member of a clutch secured to the motor shaft, a solenoid, having a polygonal opening and a correspondingly shaped core movable therein, a second clutch element carried by said core, resilient means for normally retaining the clutch members in engagement, a relay including a switch and electro-magnet for operating the same, a circuit connecting the motor, the solenoid, the switch and a source of current, a current controller mounted for movement in unison with the semaphore arm, a manually operable switch and a circuit including the source of current, said current controller, and the relay electro-magnet, whereby the electro-magnet may be energized to actuate the switch to energize the solenoid whereby the clutch members may be engaged whereby when the motor is thus energized to permit rotation thereof to move the semaphore arm to signaling position, said current controller being operable to deënergize the relay electro-magnets to permit the return of the switch to normal position whereby the motor and solenoid may be deënergized and the clutch members moved in engagement to retain the semaphore arm in signaling position.

3. In an automobile signal, a semaphore arm mounted for rotative movement, a motor adapted to rotate the arm to signaling positions, a clutch mechanism for normally holding the motor against rotation, electrical means for releasing said clutch mechanism, a relay including a double throw switch and a pair of electro-magnets for operating said switch, a pair of cross circuits connecting said motor and clutch operating mechanism with the switch and a source of current whereby movement of the switch when induced by energization of one electro-magnet will cause the motor to rotate in one direction, and a similar energization of the opposite electro-magnet will produce a rotation of the motor in an opposite direction, said clutch releasing means being energizable in either case to permit rotation of the motor, a double-throw manually operable switch, a current controller rotatable in unison with the semaphore arm and a circuit including the source of current, the double throw switch, the controller, and the electro-magnets whereby movement of the manually operable switch in either direction will cause energization of one or the other of the electro-magnets for actuating the double-throw switch in the manner set forth, said current controller being operable to deënergize one or the other of the electro-magnets when the semaphore arm has moved to signaling position to retain the same therewith.

4. In an automobile signal a semaphore arm mounted for rotation, an electric motor adapted to move the arm to signaling positions, a clutch mechanism for normally holding the motor against rotation, electrically operable means for releasing the clutch in circuit with the motor, a double throw reversing switch, in circuit with the motor, a clutch releasing means and a source of current, a pair of electromagnets for operating said reversing switch, a current controller movable in unison with the semaphore, a three point switch in communication with the electro-magnets, the current controller and the source of current whereby one or the other of the electro-magnets may be energized to cause movement of the double throw switch to energize the motor to rotate the arm in one direction or the other as the case may be, said clutch releasing means being simultaneously energized to permit rotation of the motor and later deënergized to retain the same against movement when the arm has been moved to signaling position, and a switch and electro-magnet for operating the same in communication with the three point switch and the current controller, whereby when said last mentioned electro-magnet is energized after the arm has moved to signaling position, said switch controlled by said electro-magnet may be actuated to energize the motor, and the clutch releasing means to return the semaphore arm to normal position, said current controller being operable to deënergize said electro-magnet when said arm has been returned to normal position.

In testimony whereof I affix my signature in presence of two witnesses.

WILLY H. R. MILDEBRATH.

Witnesses:
JOHN E. STEPHENSON,
FRED'K W. LOHSE.